(12) United States Patent
Foster, Jr. et al.

(10) Patent No.: US 9,073,602 B1
(45) Date of Patent: Jul. 7, 2015

(54) GEAR ASSEMBLY

(71) Applicants: James P. Foster, Jr., St. Joseph, MO (US); Jeff Swain, Winfield, TN (US)

(72) Inventors: James P. Foster, Jr., St. Joseph, MO (US); Jeff Swain, Winfield, TN (US)

(73) Assignee: James P. Foster, Jr., St. Joseph, MO (US)

( * ) Notice: Subject to any disclaimer, the term of this patent is extended or adjusted under 35 U.S.C. 154(b) by 0 days.

(21) Appl. No.: 14/229,167

(22) Filed: Mar. 28, 2014

(51) Int. Cl.
  *B62M 9/04* (2006.01)
  *F16H 3/14* (2006.01)
  *B62M 11/10* (2006.01)

(52) U.S. Cl.
  CPC .................................... *B62M 11/10* (2013.01)

(58) Field of Classification Search
  USPC ............ 74/355, 361, 362, 366, 370; 280/237, 280/260
  See application file for complete search history.

(56) References Cited

U.S. PATENT DOCUMENTS

| 519,933 | A | * | 5/1894 | Swedlund | 475/298 |
| 2,942,490 | A | * | 6/1960 | Riley, Jr. et al. | 74/370 |
| 5,435,583 | A | | 7/1995 | Foster, Jr. | |
| 5,575,731 | A | * | 11/1996 | Chung | 475/307 |
| 5,765,671 | A | * | 6/1998 | Endo et al. | 192/48.2 |
| 5,765,847 | A | * | 6/1998 | Toronto et al. | 280/237 |
| 5,884,927 | A | * | 3/1999 | Mahaney et al. | 280/237 |

\* cited by examiner

*Primary Examiner* — Ha D Ho
(74) *Attorney, Agent, or Firm* — Stinson Leonard Street LLP (57) ABSTRACT

A gear assembly having a shaft, a clutch assembly mounted to the shaft and moveable between forward and reverse positions, forward and reverse drive gears that rotate independently of the shaft, and a transfer gear assembly. When in the forward position, the clutch assembly engages the forward drive gear so that the forward drive gear rotates in the same direction as the shaft. When in the reverse position, the clutch assembly engages the reverse drive gear, which engages the transfer gear assembly to rotate the forward drive gear in the opposite direction as the shaft. The gear assembly may be used on a bicycle to allow a rider to propel the bicycle forward by either pedaling forward or backward.

11 Claims, 5 Drawing Sheets

GEAR ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a gear assembly and in particular to a gear assembly operable to convert a bidirectional input into a unidirectional output.

2. Description of Related Art

The gearing necessary to transfer the pedaling motion of a rider of a bicycle into the forward motion of that bicycle is well known in the art. Such gearing has spanned from the single ratio, two sprocket system to the more recent complicated ten and fifteen gear derailleur systems used on many current bicycles' gearing assemblies.

Early bicycles typically have a drive system that directly connects the pedals to the rear wheel. Thus, forward pedaling causes the bicycle to move in a forward direction, while rearward pedaling causes the bicycle to move in a rearward or reverse direction. This drive system is unsatisfactory because the bicycle needs to be constantly pedaled in order to continue moving forward. Also, if the rider elects to stop applying pressure to pedal the bicycle, the forward momentum of the bicycle still causes the bicycle to move forward and the pedals to continue rotating. Many bicycles of this type have a braking mechanism in the rear axle bearing assembly such that rotating the pedals in reverse engages the rear brake to stop the rear wheel rotation and the bicycle forward motion.

Newer bicycle gearing systems allow the bicycle rear wheel to continue rotating forward even when the forward sprocket gear and drive chain remain stationary. In such a system, a rider's rotary pedaling motion is transferred from a front sprocket to a rear free wheel sprocket cluster via a chain. The rear free wheel sprocket cluster transfers forward pedal rotation to the rear wheel and allows the rear wheel to rotate forward when the pedals are stationary. Most bicycles of this type have hand brakes that engage pads which apply pressure to the rim of the tire thereby stopping the bicycle. With this type of braking system, rearward pedaling is free-action, neither engaging a braking system nor causing the bike to move in a rearward direction.

Another type of bicycle gearing system described in U.S. Pat. No. 5,435,583 allows a rider to move a bicycle forward by either pedaling forward or by pedaling backward. By allowing the rider to pedal backward and still move the bicycle forward, this system allows the rider to exercise different portions of his/her leg muscles than the portions typically exercised by forward pedaling. The design of the gear system, however, makes it difficult to retrofit the system to an existing bicycle. Further, the gears within the system are prone to break when a high level of power is applied to the pedals.

BRIEF SUMMARY OF THE INVENTION

The present invention is directed to a gear assembly that is operable to convert a bidirectional input into a unidirectional output. The gear assembly may be used with a bicycle so that a rider can move the bicycle forward by either pedaling forward or backward. The gear assembly may also be used in other applications in which it is desirable to convert a bidirectional input into a unidirectional output.

The gear assembly includes a first shaft, a clutch assembly mounted on the first shaft, forward and reverse drive gears that are mounted on the first shaft so that they rotate independently of the first shaft, and a transfer gear assembly. The clutch assembly is movable between forward, neutral, and reverse positions. When the clutch assembly is in the forward position, it engages the forward drive gear, and when the clutch assembly is in the reverse position, it engages the reverse drive gear. The transfer gear assembly includes second and third shafts that are positioned parallel to the first shaft. A first transfer gear mounted to the second shaft, engages, and rotates in an opposite direction as, the reverse drive gear. A second transfer gear is also mounted to the second shaft. A third transfer gear mounted to the third shaft, engages, and rotates in an opposite direction as, the forward drive gear. A fourth transfer gear is also mounted to the third shaft. A fifth transfer gear engages each of the second and fourth transfer gears such that the second transfer gear and second shaft rotate in an opposite direction as the fourth transfer gear and third shaft.

When used with a bicycle, a front sprocket of the bicycle may be connected to the forward drive gear, and pedals are connected to either end of the first shaft with crank arms. When pedaling forward, the clutch assembly is moved to the forward position, and rotation of the first shaft via the pedals causes forward rotation (i.e., clockwise rotation when viewing the right side of the bicycle) of the forward drive gear and front sprocket to propel the bicycle forward. When pedaling in reverse, the clutch assembly is moved to the reverse position. Rotation of the first shaft in reverse via the pedals causes reverse rotation of the reverse drive gear. The first and second transfer gears and second shaft rotate forward. The third and fourth transfer gears and third shaft rotate in reverse. The forward drive gear and front sprocket rotate forward to propel the bicycle forward. Thus, the rider may exercise certain portions of his/her leg muscles by pedaling forward and other portions of his/her leg muscles by pedaling in reverse.

The gear assembly preferably includes a cylindrical housing within which the clutch assembly, forward and reverse drive gears, and transfer gear assembly are mounted. The cylindrical housing may be mounted within the bottom bracket shell of a conventional bicycle so that the gear assembly may be retrofit to a conventional bicycle.

DETAILED DESCRIPTION OF PREFERRED EMBODIMENT

Figure 1:
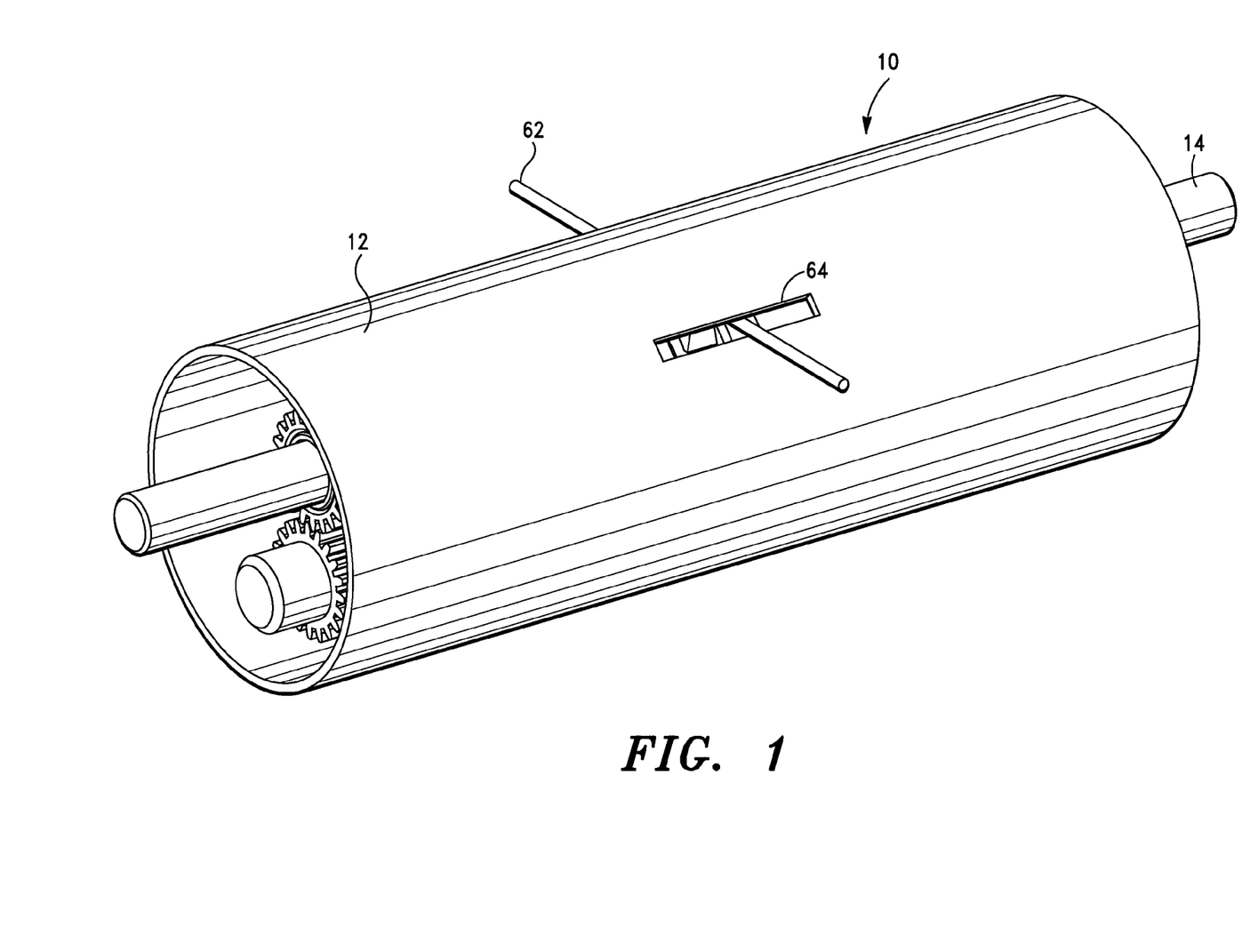
FIG. 1 is a perspective view of a gear assembly in accordance with the present invention.
Figure 2:
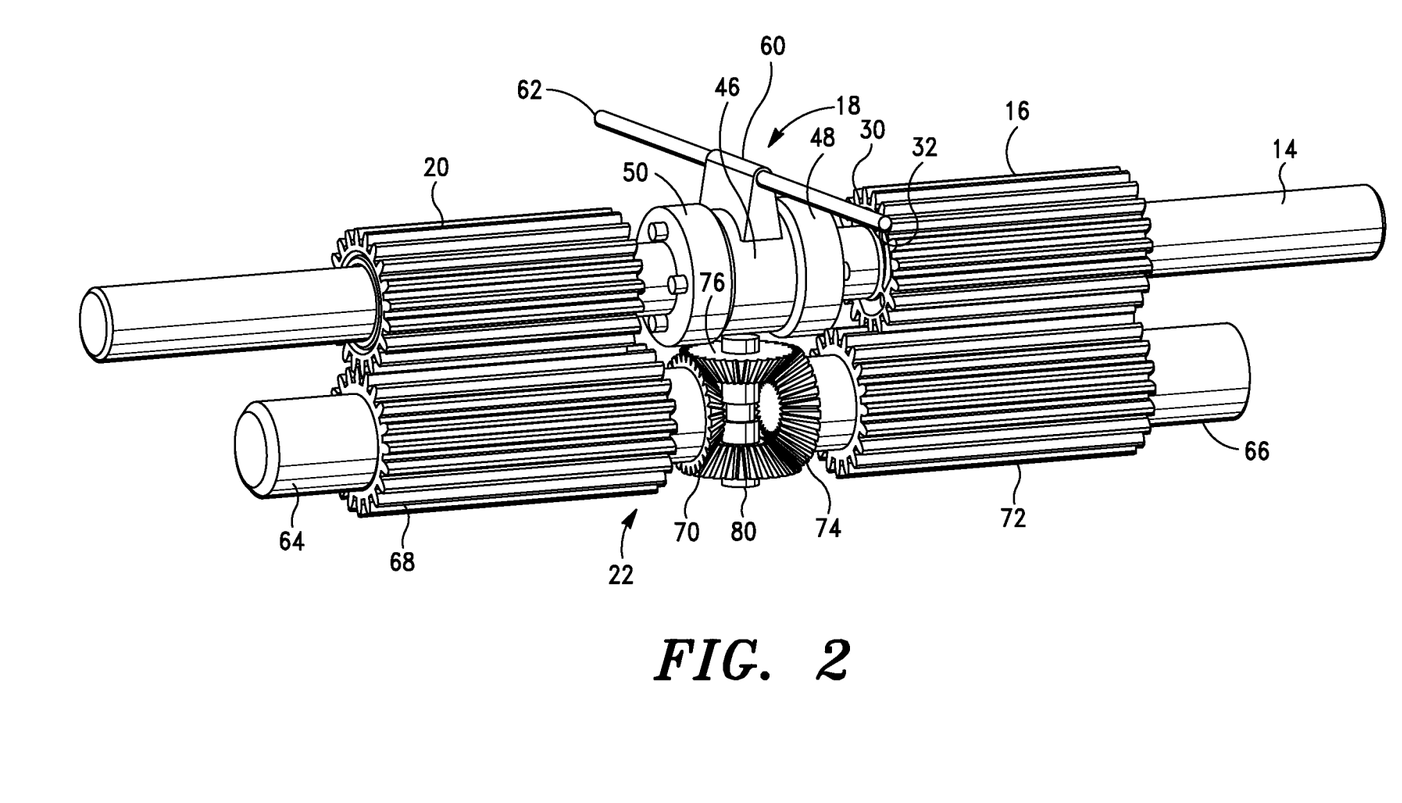
FIG. 2 is a perspective view of the gear assembly of FIG. 1 without a cylindrical housing.

Referring to FIG. 1, a gear assembly in accordance with the present invention is shown generally as 10. Gear assembly 10 includes a cylindrical housing 12, shown in FIG. 1, within which is positioned, as shown in FIG. 2, a first shaft 14, forward drive gear 16, clutch assembly 18, reverse drive gear 20, and transfer gear assembly 22. As described in detail below, clutch assembly 18 is moveable between forward, neutral, and reverse positions. In the forward position shown in FIG. 4, rotation of first shaft 14 in a first direction causes rotation of forward drive gear 16 in the first direction. In the reverse position shown in FIG. 5, rotation of first shaft 14 in a second direction that is opposite to the first direction causes rotation of forward drive gear 16 in the first direction. Thus, no matter which direction first shaft 14 rotates, gear assembly 10 is operable to convert the rotation of first shaft 14 into rotation of forward drive gear 16 in the first direction via movement of clutch assembly 18 between forward and reverse positions.

Figure 7:
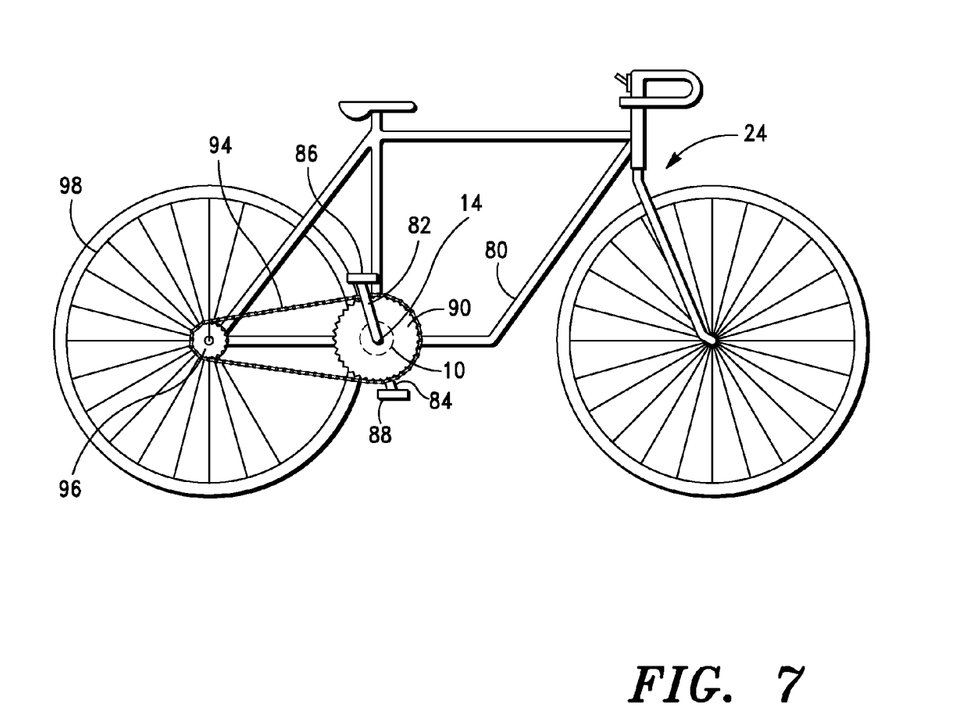
FIG. 7 is a side elevational view of a bicycle to which the gear assembly of FIG. 1 is mounted.

Gear assembly 10 may be used with a bicycle 24, shown in FIG. 7, in order to permit a rider to propel the bicycle 24 in a forward direction no matter which direction the rider rotates the pedals, i.e., if the rider pedals in a forward or clockwise direction when viewing the right side of the bicycle 24 as shown in FIG. 7 and the clutch assembly 18 is in the forward position, the bicycle 24 moves forward, and if the rider pedals in a backward or counter-clockwise direction when viewing the right side of the bicycle 24 as shown in FIG. 7 and the clutch assembly 18 is in the reverse position, the bicycle 24 also moves forward. In addition, gear assembly 10 may be used in other applications in which it is desirable to convert clockwise and counterclockwise rotation of a shaft (e.g., first shaft 14) into rotation of another gear or shaft (e.g., forward drive gear 16) in a single direction.

Figure 3:
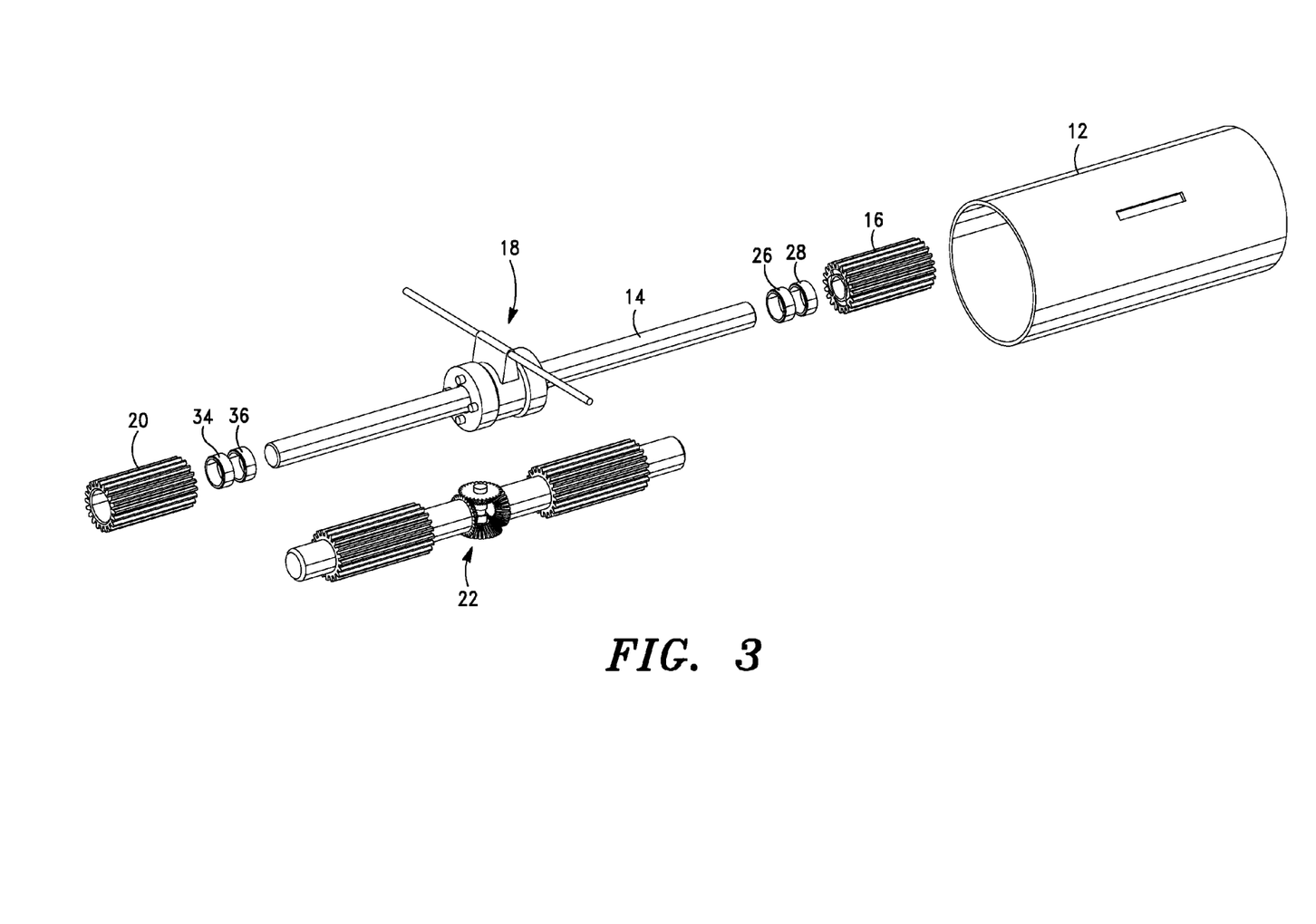
FIG. 3 is a partial exploded view of the gear assembly of FIG. 1.
Figure 6:
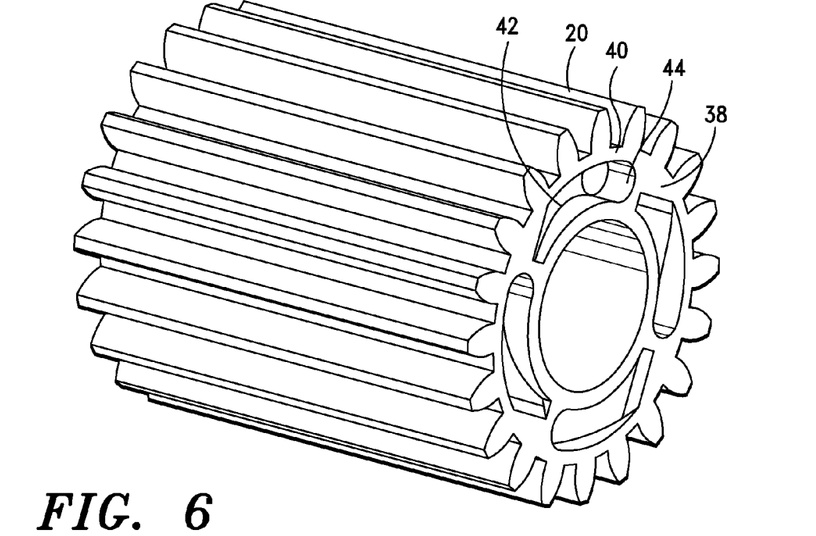
FIG. 6 is a perspective view of a reverse drive gear of the gear assembly of FIG. 1.

Forward drive gear 16 is rotatably mounted to first shaft 14 via bearings 26 and 28, shown in FIG. 3, such that forward drive gear 16 is rotatable independently of first shaft 14. Referring to FIG. 2, forward drive gear 16 has a first clutch engaging surface 30, which includes four slots, one of which is identified as 32. Reverse drive gear 20 is rotatably mounted to first shaft 14 via bearings 34 and 36, shown in FIG. 3, such that reverse drive gear 20 is rotatable independently of first shaft 14. Referring to FIG. 6, reverse drive gear 20 has a second clutch engaging surface 38, which includes four slots, one of which is identified as 40. Slot 40 includes a ramp portion 42 with a depth that gradually increases from second clutch engaging surface 38 to a cylindrical portion 44. Each of the slots in first clutch engaging surface 30 and second clutch engaging surface 38 are substantially similar to slot 40. The slots 32 in forward drive gear 16 are oriented so that pins 54 of first rotor 48 will only be retained within the slots 32 when first shaft 14 rotates forward or clockwise when viewed as shown in FIG. 7. If first shaft 14 is rotated in reverse or counter-clockwise when viewed as shown in FIG. 7, pins 54 will move up ramp portion 42 (FIG. 6) and slide out of the slots 32. Likewise, slots 40 in reverse drive gear 20 are oriented so that pins 58 of second rotor 50 will only be retained within the slots 40 when first shaft rotates in reverse or counter-clockwise when viewed as shown in FIG. 7.

Clutch assembly 18 is mounted to first shaft 14 between forward drive gear 16 and reverse drive gear 20. Clutch assembly 18 includes a central housing 46, a first rotor 48 rotatably mounted to one side of housing 46, and a second rotor 50 rotatably mounted to the opposite side of housing 46. First and second rotors 48 and 50 are mounted to first shaft 14 such that the rotors 48 and 50 rotate with rotation of first shaft 14. Central housing 46 is stationary when first and second rotors 48 and 50 rotate. First rotor 48 includes a first clutch surface 52, shown in FIG. 5, from which four pins, one of which is identified as 54, protrude. Second rotor 50 includes a second clutch surface 56, shown in FIG. 4, from which four pins, one of which is identified as 58, protrude. When the clutch assembly 18 is in the forward position shown in FIG. 4, slots 32 (FIG. 2) receive pins 54 (FIG. 5) to transfer torque from first shaft 14 to forward drive gear 16 via first rotor 48. When the clutch assembly 18 is in the reverse position shown in FIG. 5, slots 40 (FIG. 6) receive pins 58 (FIG. 4) to transfer torque from first shaft 14 to reverse drive gear 20 via second rotor 50.

When second rotor 50 is moved toward reverse drive gear 20, slots 40 are configured so that each pin 58 first engages a ramp portion 42 (FIG. 6) of a slot 40 so that second rotor 50 gradually engages reverse drive gear 20. As second rotor 50 rotates, the pins 58 move through the slots 40 into the cylindrical portion 44. When the pins 58 are in the cylindrical portion 44 of the slots 40, rotor 50 is engaged and rotates with reverse drive gear 20. The pins 54 (FIG. 5) of first rotor 48 engage slots 32 (FIG. 2) in a similar manner.

Referring to FIG. 2, central housing 46 of clutch assembly 18 includes a lever mount 60 extending upward above rotors 48 and 50. A shifting lever 62 extends outward from both sides of lever mount 60 through openings 64 (FIG. 1) in housing 12. The shifting lever 62 may be used to move the clutch assembly 18 between the neutral position shown in FIG. 2, the forward position shown in FIG. 4, and the reverse position shown in FIG. 5. When gear assembly 10 is used in connection with a bicycle 24, as shown in FIG. 7, a vertical arm (not shown) may be attached to shifting lever 62 to permit a rider to move clutch assembly 18 between the neutral, forward, and reverse positions. A motor (not shown) may also be used to move the clutch assembly 18.

As shown in FIG. 2, transfer gear assembly 22 includes a second shaft 64 and a third shaft 66 that are positioned parallel to first shaft 14. Second shaft 64 is positioned below reverse drive gear 20, and third shaft 66 is positioned below forward drive gear 16. A first transfer gear 68 is mounted to second shaft 64 and engages reverse drive gear 20 such that first transfer gear 68 rotates in the opposite direction as reverse drive gear 20. A second transfer gear 70 is mounted to an end of second shaft 64. A third transfer gear 72 is mounted to third shaft 66 and engages forward drive gear 16 such that third transfer gear 72 rotates in the opposite direction as forward drive gear 16. A fourth transfer gear 74 is mounted to an end of third shaft 66. Fifth and sixth transfer gears 76 and 78, respectively, are mounted to a fourth shaft 80 that is positioned below clutch assembly 18 and is oriented perpendicular to second and third shafts 64 and 66.

Second, fourth, fifth, and sixth transfer gears 70, 74, 76, and 78 are bevel gears. Second transfer gear 70 engages fifth and sixth transfer gears 76 and 78, and fourth transfer gear 74 engages fifth and sixth transfer gears 76 and 78. Second, fourth, fifth, and sixth transfer gears 70, 74, 76, and 78 transfer torque from second shaft 64 to third shaft 66 such that third shaft 66 rotates in the opposite direction as second shaft 64. Gear assembly 10 preferably also includes mounts (not shown) joined to housing 12 (FIG. 1) that retain bearings (not shown) for supporting first, second, and third shafts 14, 64, and 66 relative to housing 12.

Figure 4:
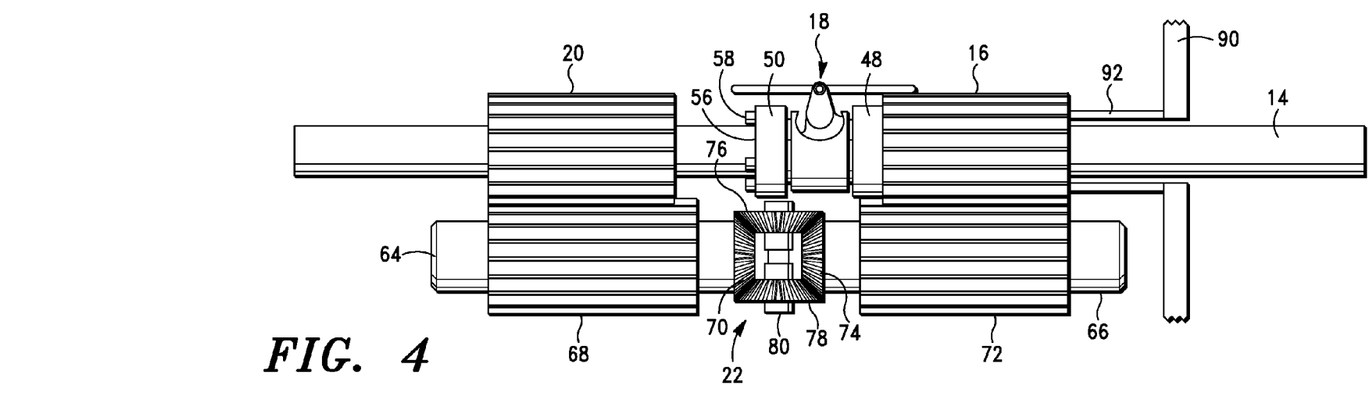
FIG. 4 is a rear elevational view of a portion of the gear assembly of FIG. 1 with a clutch assembly shown in a forward position.
Figure 5:
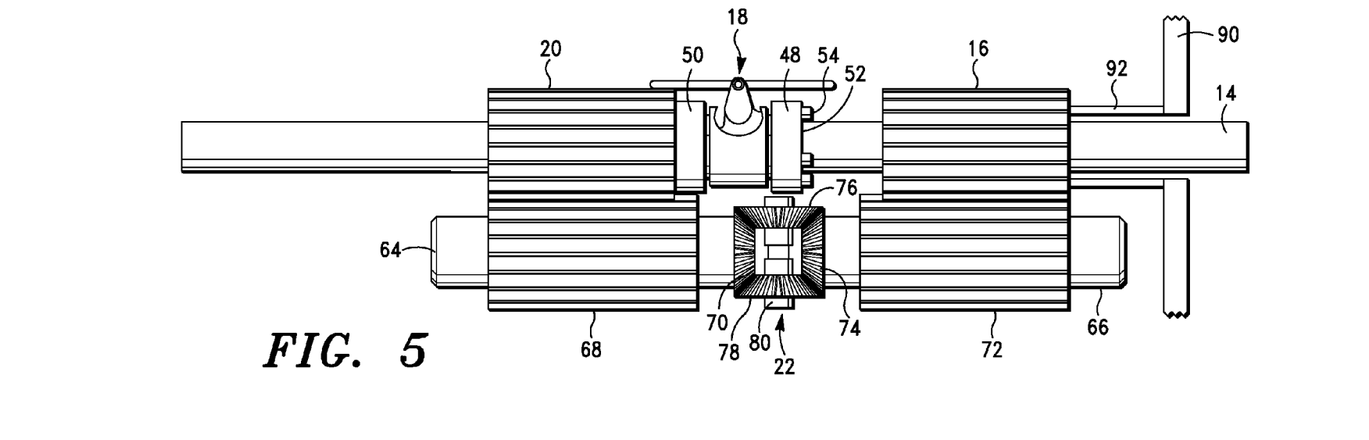
FIG. 5 is a rear elevational view of a portion of the gear assembly of FIG. 1 with the clutch assembly shown in a reverse position.

Referring to FIG. 7, in one embodiment, gear assembly 10 is mounted to a bicycle 24. Housing 12 (FIG. 1) may be mounted to the bicycle 24 within a bottom bracket shell (not shown) of a frame 80 of the bicycle 24 in lieu of a conventional bottom bracket (not shown). The gear assembly 10 may be mounted to the bicycle 24 during initial manufacture of the bicycle 24 or retrofit to an existing bicycle 24. Because housing 12 is cylindrical, it may be inserted into the tubular bottom bracket shell of a conventional bicycle without modifying the bicycle frame. Crank arms 82 and 84 are connected to opposite ends of first shaft 14, and first and second pedals 86 and 88 are connected to ends of crank arms 82 and 84, respectively. As shown in FIGS. 4 and 5, a front sprocket 90 is joined to forward drive gear 16 via a tube 92 that encircles a portion of first shaft 14. Tube 92 connects forward drive gear 16 and front sprocket 90 such that they rotate with each other. As shown in FIG. 7, front sprocket 90 engages a chain 94, which engages a rear sprocket 96 that is coupled to a rear wheel 98.

In operation, when it is desired for forward drive gear 16 to rotate in the same direction as first shaft 14, clutch assembly 18 is moved to the forward position shown in FIG. 4. In this position, forward drive gear 16 is connected to first shaft 14 via first rotor 48 so that forward drive gear 16, front sprocket 90, and first shaft rotate 14 in the same direction. When gear assembly 10 is used with bicycle 24 and clutch assembly 18 is in the forward position, clockwise or forward rotation of pedals 86 and 88 when viewed as shown in FIG. 7 causes clockwise rotation of front sprocket 90, which moves bicycle 24 forward, i.e., to the right in FIG. 7.

When it is desired for forward drive gear 16 to rotate in the opposite direction as first shaft 14, clutch assembly 18 is moved to the reverse position shown in FIG. 5. In this position, reverse drive gear 20 is connected to first shaft 14 via second rotor 50 so that reverse drive gear 20 and first shaft 14 rotate in the same direction. Reverse drive gear 20 engages first transfer gear 68 so that second shaft 64 rotates in the opposite direction as first shaft 14. Second transfer gear 70 engages fifth and sixth transfer gears 76 and 78, which engage fourth transfer gear 74 so that third shaft 66 rotates in the same direction as first shaft 14 and in the opposite direction as second shaft 64. Second transfer gear 72 engages forward drive gear 16 so that forward drive gear 16 and front sprocket 90 rotate in the opposite direction as first shaft 14 and third shaft 66 and in the same direction as second shaft 64. When gear assembly 10 is used with bicycle 24 and clutch assembly 18 is in the reverse position, counter-clockwise or reverse rotation of pedals 86 and 88 when viewed as shown in FIG. 7 causes clockwise rotation of front sprocket 90, which moves bicycle 24 forward. Thus, a rider of bicycle 24 can move the bicycle 24 forward by either pedaling in a forward direction with clutch assembly 18 in the forward position or by pedaling in a reverse direction with clutch assembly 18 in the reverse position.

If the rider pedals in a reverse direction when the clutch assembly 18 is in the forward position shown in FIG. 4, pins 54 (FIG. 5) will disengage from slots 32 (FIG. 2), and the pedals 86 and 88 will no longer be connected to front sprocket 90, due to the ramp portion 42 (FIG. 6) of the slots. Likewise, if the rider pedals in a forward direction when the clutch assembly 18 in the reverse position shown in FIG. 5, pins 58 (FIG. 4) will disengage from slots 40 (FIG. 6), and the pedals 86 and 88 will no longer be connected to front sprocket 90, due to the ramp portion 42 of the slots. The clutch assembly 18 may be moved to the neutral position shown in FIG. 2 if it is desired to rotate the pedals 86 and 88 without moving the bicycle 24.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A gear assembly comprising:
   a first shaft;
   a clutch assembly comprising first and second clutch surfaces mounted on the first shaft such that the first and second clutch surfaces rotate with rotation of the first shaft, wherein the clutch assembly is movable between forward, neutral, and reverse positions;
   a forward drive gear rotatably mounted to the first shaft such that the forward drive gear is rotatable independently of the first shaft, wherein the forward drive gear comprises a first clutch engaging surface that engages the first clutch surface when the clutch assembly is in the forward position;
   a reverse drive gear rotatably mounted to the first shaft such that the reverse drive gear is rotatable independently of the first shaft, wherein the reverse drive gear comprises a second clutch engaging surface that engages the second clutch surface when the clutch assembly is in the reverse position; and
   a transfer gear assembly comprising:
      second and third shafts positioned parallel to the first shaft;
      a first transfer gear mounted to the second shaft, wherein the first transfer gear engages the reverse drive gear such that the first transfer gear rotates in an opposite direction as the reverse drive gear;
      a second transfer gear mounted to the second shaft;
      a third transfer gear mounted to the third shaft, wherein the third transfer gear engages the forward drive gear such that the third transfer gear rotates in an opposite direction as the forward drive gear;
      a fourth transfer gear mounted to the third shaft; and
      a fifth transfer gear that engages each of the second and fourth transfer gears such that the second transfer gear and second shaft rotate in an opposite direction as the fourth transfer gear and third shaft.

2. The gear assembly of claim 1, wherein when the clutch assembly is in the forward position, rotation of the first shaft in a first direction causes rotation of the forward drive gear in the first direction, and wherein when the clutch assembly is in the reverse position, rotation of the first shaft in a second direction that is opposite to the first direction causes rotation of the forward drive gear in the first direction.

3. The gear assembly of claim 1, wherein when the clutch assembly is in the neutral position, rotation of the first shaft does not cause rotation of the forward drive gear.

4. The gear assembly of claim 1, wherein the second, fourth, and fifth transfer gears are bevel gears, and the fifth transfer gear is mounted to a fourth shaft that is perpendicular to the second and third shafts.

5. The gear assembly of claim 1, further comprising a shifting lever coupled to the clutch assembly and operable to move the clutch assembly between the forward, neutral, and reverse positions.

6. The gear assembly of claim 1, further comprising a first bearing positioned between the first shaft and the forward drive gear, and a second bearing positioned between the first shaft and the reverse drive gear.

7. The gear assembly of claim 1, further comprising a cylindrical housing within which at least a portion of each of the first shaft, the clutch assembly, the forward drive gear, the reverse drive gear, and the transfer gear assembly are positioned.

8. The gear assembly of claim 7, wherein the housing is mounted to a bicycle frame.

9. The gear assembly of claim 8, further comprising a first pedal coupled to a first end of the first shaft, and a second pedal coupled to a second end of the first shaft.

10. The gear assembly of claim 9, further comprising a front sprocket that is joined to the forward drive gear.

11. The gear assembly of claim 10, further comprising:
   a rear sprocket coupled to a rear wheel of the bicycle; and
   a chain engaging the front sprocket and rear sprocket.

* * * * *

UNITED STATES PATENT AND TRADEMARK OFFICE
CERTIFICATE OF CORRECTION

| | | |
|---|---|---|
| PATENT NO. | : 9,073,602 B1 | Page 1 of 1 |
| APPLICATION NO. | : 14/229167 | |
| DATED | : July 7, 2015 | |
| INVENTOR(S) | : James P. Foster, Jr. et al. | |

It is certified that error appears in the above-identified patent and that said Letters Patent is hereby corrected as shown below:

Title page, "Applicants", Item (71), delete "Jeff Swain, Winfield, TN (US)".

Signed and Sealed this
Sixteenth Day of February, 2016

Michelle K. Lee
*Director of the United States Patent and Trademark Office*